United States Patent
Adachi et al.

(10) Patent No.: US 10,574,376 B2
(45) Date of Patent: Feb. 25, 2020

(54) TRANSMISSION DEVICE, RECEPTION DEVICE, AND COMMUNICATION METHOD

(71) Applicant: Panasonic Intellectual Property Management Co., Ltd., Osaka (JP)

(72) Inventors: Naoki Adachi, Kanagawa (JP);
Tomohiro Kimura, Osaka (JP);
Takayuki Sotoyama, Kanagawa (JP);
Kazuaki Takahashi, Tokyo (JP);
Naganori Shirakata, Kanagawa (JP);
Koji Takinami, Kanagawa (JP);
Takenori Sakamoto, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/069,850

(22) PCT Filed: Jun. 13, 2016

(86) PCT No.: PCT/JP2016/002835
§ 371 (c)(1),
(2) Date: Jul. 12, 2018

(87) PCT Pub. No.: WO2017/125968
PCT Pub. Date: Jul. 27, 2017

(65) Prior Publication Data
US 2019/0020434 A1 Jan. 17, 2019

(30) Foreign Application Priority Data
Jan. 20, 2016 (JP) .................. 2016-008882

(51) Int. Cl.
*H04L 12/28* (2006.01)
*H04J 11/00* (2006.01)
(Continued)

(52) U.S. Cl.
CPC ................ *H04J 11/00* (2013.01); *H04L 5/04* (2013.01); *H04J 2011/0003* (2013.01); *H04L 27/06* (2013.01)

(58) Field of Classification Search
CPC ........................................................ H04L 12/28
(Continued)

(56) References Cited

U.S. PATENT DOCUMENTS 9,240,917 B2   1/2016  Chen et al.
9,571,196 B2 * 2/2017  Martelli ............. H04B 10/2581
(Continued)

FOREIGN PATENT DOCUMENTS

JP   2015-207799 A   11/2015
WO   2014/199451 A1  12/2014
(Continued)

OTHER PUBLICATIONS

Allen et al., "Wireless data encoding and decoding using OAM modes," Electronic Letters, vol. 50, Issue: 3, Jan. 30, 2014, pp. 232-233, 4 pages.
(Continued)

*Primary Examiner* — Dang T Ton
(74) *Attorney, Agent, or Firm* — Seed IP Law Group LLP

(57) ABSTRACT

A transmission device includes: a modulator that selects an Orbital Angular Momentum (OAM) propagation mode among N (N is an integer equal to or greater than 2) OAM propagation modes in accordance with a value of bit data to be transmitted; and a transmitter that transmits a signal of the OAM propagation mode selected by the modulator.

8 Claims, 7 Drawing Sheets

(51) Int. Cl.
*H04L 5/04* (2006.01)
*H04L 27/06* (2006.01)

(58) Field of Classification Search
USPC .......................................... 370/329
See application file for complete search history.

(56) References Cited

U.S. PATENT DOCUMENTS

2016/0028163 A1   1/2016   Li et al.
2017/0062910 A1   3/2017   Iida

FOREIGN PATENT DOCUMENTS

WO   2015/067987 A1   5/2015
WO   2015/159808 A1   10/2015

OTHER PUBLICATIONS

The Extended European Search Report dated Jan. 3, 2019 for the related European Patent Application No. 16886214.2.

* cited by examiner

FIG. 4

| DATA | OAM PROPAGATION MODE |
|------|----------------------|
| 00   | 0-ORDER MODE         |
| 01   | +1-ORDER MODE        |
| 10   | -1-ORDER MODE        |
| 11   | 2-ORDER MODE         |

FIG. 6

| DATA | OAM PROPAGATION MODE |
|------|----------------------|
| 00 | 0-ORDER MODE, +1-ORDER MODE |
| 01 | +1-ORDER MODE, -1-ORDER MODE |
| 10 | -1-ORDER MODE, 2-ORDER MODE |
| 11 | 2-ORDER MODE, 0-ORDER MODE |

TRANSMISSION DEVICE, RECEPTION DEVICE, AND COMMUNICATION METHOD

This application is a U.S. national stage application of the PCT International Application No. PCT/JP2016/002835 filed on Jun. 13, 2016, which claims the benefit of foreign priority of Japanese patent application 2016-008882 filed on Jan. 20, 2016, the contents all of which are incorporated herein by reference.

TECHNICAL FIELD

The present disclosure relates to a transmission device, a reception device, and a communication method.

BACKGROUND ART

Recently, electromagnetic waves, which have Orbital Angular Momentum (OAM), are used in wireless communication in which signals are transmitted and received using the electromagnetic waves.

In the electromagnetic waves having the OAM, a plurality of modes (hereinafter, described as OAM propagation modes) exist based on difference in phase variations with respect to an azimuth angle. The electromagnetic waves having different OAM propagation modes are orthogonal to each other.

For example, PTL 1 discloses a technology in which a plurality of transmission parabola antennas transmit electromagnetic waves, which respectively have different OAM propagation modes, and a plurality of reception parabola antennas, which form pairs with the plurality of transmission parabola antennas, receive the electromagnetic waves which are transmitted from the relevant transmission parabola antennas. According to the technology, it is possible to transmit and receive the electromagnetic waves, which have one OAM propagation mode, between a pair of the transmission parabola antenna and the reception parabola antenna, and thus it is possible to multiplex signals over a plurality of orthogonal channels.

In addition, PTL 2 and PTL 3 disclose technologies for transmitting the electromagnetic waves having different OAM propagation modes using an array antenna disposed in a circle. According to the technologies, it is possible to transmit and receive the electromagnetic waves having the plurality of OAM propagation modes, and thus it is possible to multiplex the signals over the plurality of orthogonal channels.

CITATION LIST

Patent Literature

PTL 1: International Publication No. 2014/199451
PTL 2: International Publication No. 2015/159808
PTL 3: Japanese Patent Unexamined Publication No. 2015-207799

SUMMARY OF THE INVENTION

However, in the technologies disclosed in PTL 1, PTL 2, and PTL 3, wireless signals of the electromagnetic waves having the OAM propagation modes are only used for multiplexing.

An object of the present disclosure is to provide a transmission device, a reception device, and a communication method capable of performing modulation/demodulation by selecting an OAM propagation mode in a system which performs communication using wireless signals having a plurality of OAM propagation modes.

According to the present disclosure, there is provided a transmission device including a modulator that selects an Orbital Angular Momentum (OAM) propagation mode among N (N is an integer equal to or greater than 2) OAM propagation modes in accordance with a value of bit data to be transmitted; and a transmitter that transmits a signal of the OAM propagation mode selected by the modulator.

According to the present disclosure, there is provided a reception device including: a receiver that receives a signal of an OAM propagation mode selected among N (N is an integer equal to or greater than 2) Orbital Angular Momentum (OAM) propagation modes; and a demodulator that outputs a value of bit data in accordance with the OAM propagation mode of the received signal.

According to the present disclosure, there is provided a transmission device including: a modulator that selects an Orbital Angular Momentum (OAM) propagation mode based on a pattern which indicates a selection order in which each of N (N is an integer equal to or greater than 2) OAM propagation modes is sequentially selected K (K is an integer equal to or greater than 1) times; and a transmitter that transmits a signal of the OAM propagation mode in accordance with an order selected by the modulator at one symbol interval which includes K mode intervals.

According to the present disclosure, there is provided a reception device including: a receiver that receives a signal of an OAM propagation mode corresponding to K (K is an integer equal to or greater than 1) mode intervals; and a demodulator that demodulates a symbol from the received signal based on a pattern which indicates a selection order in which at least one of N (N is an integer equal to or greater than 2) Orbital Angular Momentum (OAM) propagation modes is sequentially selected K times.

According to the present disclosure, there is provided a communication method including: selecting an Orbital Angular Momentum (OAM) propagation mode among N (N is an integer equal to or greater than 2) OAM propagation modes in accordance with a value of bit data to be transmitted; transmitting a signal of the selected OAM propagation mode; receiving the signal of the selected OAM propagation mode among N OAM propagation modes; and outputting the value of the bit data in accordance with the OAM propagation mode of the received signal.

According to the present disclosure, there is provided a communication method including: selecting an Orbital Angular Momentum (OAM) propagation mode based on a pattern which indicates a selection order in which each of N (N is an integer equal to or greater than 2) OAM propagation modes is sequentially selected K (K is an integer equal to or greater than 1) times; transmitting a signal of the OAM propagation mode in accordance with an order selected at one symbol interval which includes K mode intervals; receiving the signal of the OAM propagation mode corresponding to K mode intervals; and demodulating a symbol from the received signal based on the pattern.

According to the present disclosure, it is possible to perform modulation/demodulate using the plurality of OAM propagation modes.

BRIEF DESCRIPTION OF DRAWINGS

FIG. 4 is a diagram illustrating an example of a table according to the first exemplary embodiment of the present disclosure.

FIG. 6 is a diagram illustrating another example of the table according to the first exemplary embodiment of the present disclosure.

DESCRIPTION OF EMBODIMENTS

Exemplary embodiments of the present disclosure will be described in detail with reference to the accompanying drawings. The respective exemplary embodiments, which are described below, are only examples, and the present disclosure is not limited to the exemplary embodiments.

(First Exemplary Embodiment)

Figure 1:
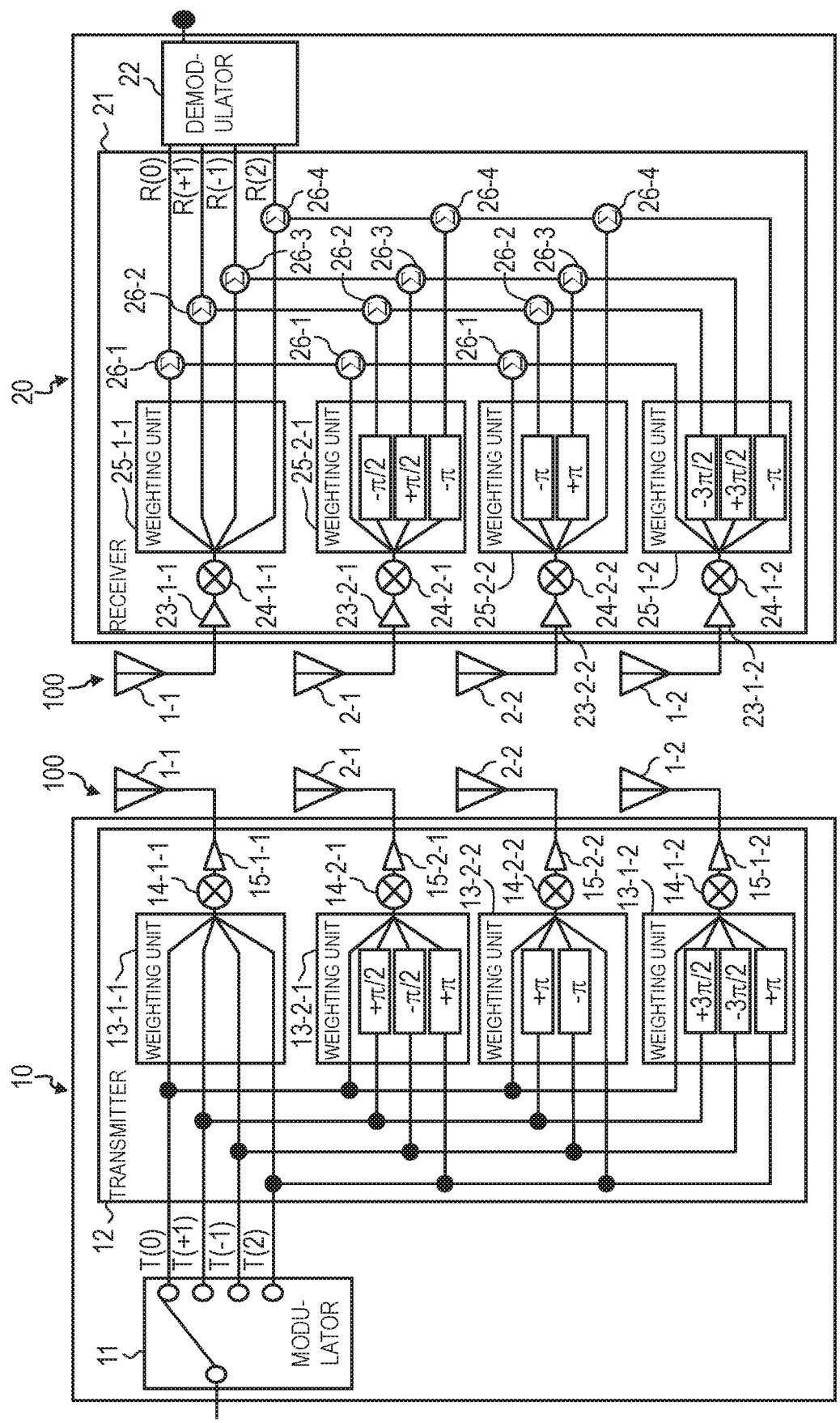
FIG. 1 is a diagram illustrating an example of an OAM multiplex transmission system according to a first exemplary embodiment of the present disclosure.

FIG. 1 is a diagram illustrating an example of an OAM transmission system according to a first exemplary embodiment of the present disclosure. The OAM transmission system according to the exemplary embodiment is a system which performs communication in four OAM propagation modes including 0-order, 1-order, −1-order, and 2-order. The OAM transmission system includes transmission device 10 and reception device 20. Any one of −2-order and +2-order OAM propagation modes or an OAM propagation mode, in which the −2-order and +2-order OAM propagation modes are mixed, is used as the 2-order OAM propagation mode.

Transmission device 10 includes array antenna 100, modulator 11, and transmitter 12.

Figure 2:
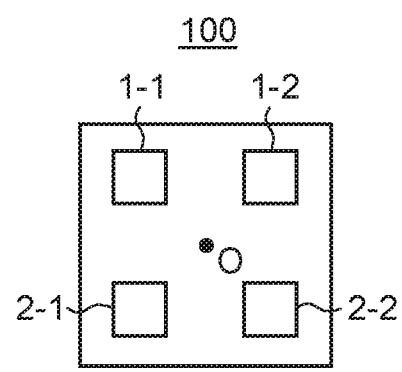
FIG. 2 is a diagram illustrating an example of a 2×2 array antenna disposed in square.

Array antenna 100 according to the exemplary embodiment has a configuration in which four antenna elements are disposed in a lattice on a plane. FIG. 2 is a diagram illustrating an example of a configuration of array antenna 100.

Array antenna 100 illustrated in FIG. 2 is a 2×2 phased array which is disposed in square and in which four antenna elements including two elements disposed in a horizontal direction and two elements disposed in a vertical direction are disposed. Hereinafter, the respective four antenna elements are described as antenna elements 1-1 to 2-2 based on locations illustrated in FIG. 2.

Returning to the description of FIG. 1, modulator 11 includes a table in which information to be input is associated with the OAM propagation modes. Modulator 11 is connected to connection terminals T(0), T(+1), T(−1), and T(2) corresponding to the respective OAM propagation modes. Modulator 11 selects any one of the OAM propagation modes among the four OAM propagation modes based on the information to be input. Modulator 11 outputs an already-known signal from the connection terminal corresponding to the selected OAM propagation mode between transmission and reception. The table and a modulation process will be described in detail later.

Transmitter 12 performs a transmission process, such as weighting in accordance with the OAM propagation modes, up-conversion into a wireless frequency band, or amplification, on signals which are output from modulator 11, and outputs signals, on which the transmission process is performed, to array antenna 100.

Specifically, transmitter 12 includes weighting units 13-1-1 to 13-2-2, mixers 14-1-1 to 14-2-2, and amplifiers 15-1-1 to 15-2-2.

Weighting unit 13-$i$-$j$ (each of i and j is 1 or 2), mixer 14-$i$-$j$, and amplifier 15-$i$-$j$ correspond to antenna element i-j. That is, transmitter 12 includes weighting units 13, mixers 14, and amplifiers 15 corresponding to the number which is the same as the number of antenna elements.

Weighting unit 13-$i$-$j$ applies weighting of each of the OAM propagation modes in antenna element i-j with respect to the signals which are input from the respective connection terminals corresponding to the OAM propagation modes. In a case where a signal is input from connection terminal T(0), weighting unit 13-$i$-$j$ applies weighting of OAM phase shift of the 0-order OAM propagation mode in antenna element i-j. In the same manner, in a case where a signal is input from connection terminal T(+1), weighting unit 13-$i$-$j$ applies weighting of OAM phase shift of the +1-order OAM propagation mode in antenna element i-j. In a case where a signal is input from connection terminal T(−1), weighting unit 13-$i$-$j$ applies weighting of OAM phase shift of the −1-order OAM propagation mode in antenna element i-j. In a case where a signal is input from connection terminal T(2), weighting unit 13-$i$-$j$ applies weighting of OAM phase shift of the 2-order OAM propagation mode in antenna element i-j. The phase shift to which the weighting is applied will be described with reference to FIG. 3.

Figure 3:
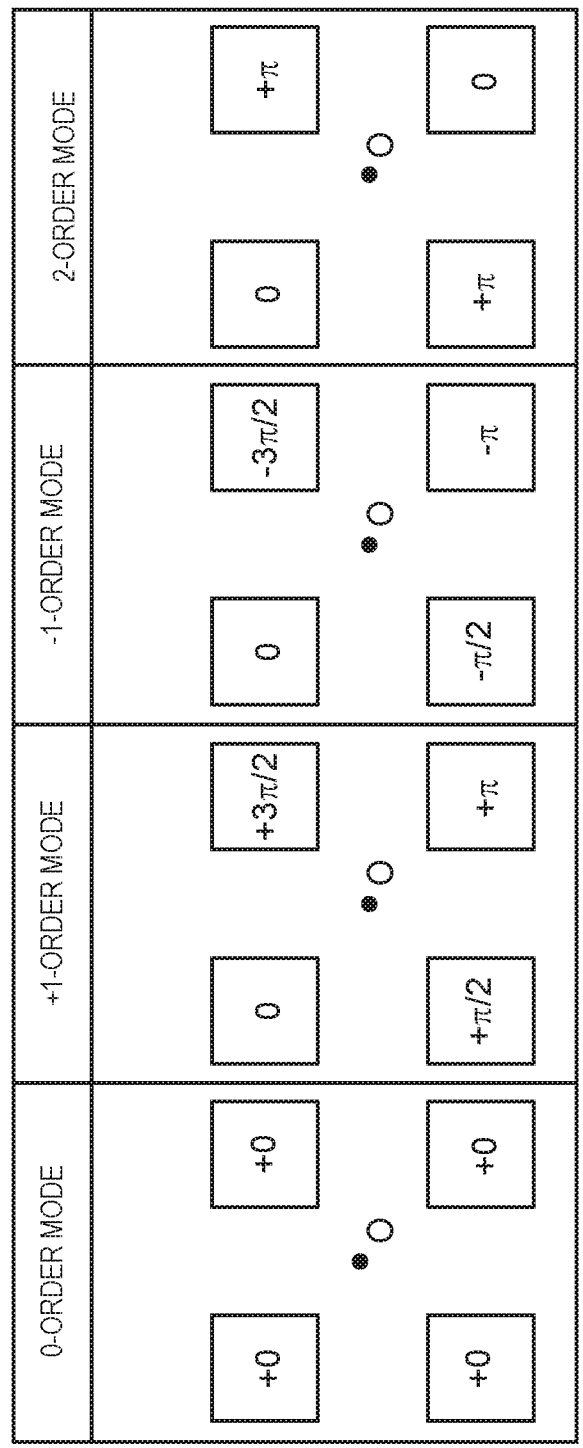
FIG. 3 is a diagram illustrating OAM phase shifts in the 2×2 array antenna disposed in square.

FIG. 3 illustrates the OAM phase shifts of the respective antenna elements of array antenna 100 for each of the OAM propagation modes.

In a case of the 0-order OAM propagation mode, all the OAM phase shifts of the respective antenna elements are 0, that is, a phase difference is not given to each other. Therefore, array antenna 100 outputs plane waves having the same phase.

In a case of the +1-order OAM propagation mode, weighting is applied such that the OAM phase shift in each of the antenna elements goes one round in a counterclockwise direction centering on point O and the phase shift changes by $2\pi$. Specifically, the OAM phase shift in antenna element 1-1 is set to 0, and OAM phase shifts in antenna element 2-1, antenna element 2-2, and antenna element 1-2 are set to $\pi/2$, $\pi$, and $3\pi/2$, respectively.

In a case of the −1-order OAM propagation mode, weighting is applied such that the OAM phase shift in each of the antenna elements goes one round in a clockwise direction centering on point O and the phase shift changes by $2\pi$. Specifically, the OAM phase shift in antenna element 1-1 is set to 0, and OAM phase shifts in antenna element 2-1, antenna element 2-2, and antenna element 1-2 are set to $-\pi/2$, $-\pi$, and $-3\pi/2$, respectively.

In a case of the 2-order OAM propagation mode, weighting is applied such that the OAM phase shift in each of the antenna elements goes one round in the counterclockwise direction centering on point O and the phase shift changes by $4\pi$. Specifically, the OAM phase shift in antenna element 1-1 is set to 0, and OAM phase shifts in antenna element 2-1, antenna element 2-2, and antenna element 1-2 are set to $\pi$, $2\pi$, and $3\pi$, respectively. A case of applying weighting corresponding to an OAM phase shift of $2\pi$ is the same as a case of not applying weighting (that is, the OAM phase shift is 0). In addition, a case of applying weighting corresponding to an OAM phase shift of $3\pi$ is the same as a case of applying weighting corresponding to the OAM phase shift of $\pi$. Therefore, in FIG. 3, the OAM phase shifts in antenna element 2-2 and antenna element 1-2 are set to 0 and $\pi$, respectively.

Returning to the description of FIG. 1, mixer 14-$i$-$j$ up-converts a signal, which is output from relevant weighting unit 13-$i$-$j$, into a carrier frequency band.

Amplifier 15-$i$-$j$ amplifies electricity of a signal, which is output from mixer 14-$i$-$j$, and outputs an amplified signal to antenna element i-j.

Antenna element i-j emits the signal which is output from amplifier 15-$i$-$j$. In a case where signals, to which the OAM phase shifts are respectively weighted, are emitted from the respective antenna elements, array antenna 100 outputs signals having the OAM propagation modes.

Reception device 20 includes array antenna 100, receiver 21, and demodulator 22. Array antenna 100 of reception device 20 has the same configuration as array antenna 100 of transmission device 10, and receives the signals which are transmitted from transmission device 10.

Receiver 21 performs a reception process, such as the amplification, the down-conversion into the baseband, weighting in accordance with the OAM propagation modes, and composition, on the signals which are received by antenna elements 1-1 to 2-2, and outputs signals, on which the reception process is performed, to demodulator 22. The signals, on which the reception process is performed, are divided (or converted) into signals corresponding to the respective OAM propagation modes.

Receiver 21 includes amplifiers 23-1-1 to 23-2-2, mixers 24-1-1 to 23-2-2, weighting units 25-1-1 to 25-2-2, and compositors 26-1 to 26-4.

Amplifier 23-$i$-$j$, mixer 24-$i$-$j$, and weighting unit 25-$i$-$j$ correspond to antenna element i-j. That is, receiver 21 includes amplifiers 23, mixers 24, and weighting units 25 corresponding to the number which is the same as the number of antenna elements.

Amplifier 23-$i$-$j$ performs amplification on electricity of a reception signal which is received by antenna element i-j, and outputs the amplified signal to mixer 24-$i$-$j$.

Mixer 24-$i$-$j$ down-converts the signal, which is output from amplifier 23-$i$-$j$, into the baseband, and outputs a signal, which is acquired through the down-conversion, to weighting unit 25-$i$-$j$.

Weighting unit 25-$i$-$j$ converts the signal, which is output from mixer 24-$i$-$j$, into signal components in the respective OAM propagation modes by applying weighting in accordance with the OAM propagation modes.

As illustrated in FIG. 1, the OAM phase shift, which is weighted in weighting unit 25-$i$-$j$, is an OAM phase shift which is acquired by inverting positive and negative parts of the OAM phase shift which is weighted in weighting unit 13-$i$-$j$ of transmission device 10.

Compositors 26-1 to 26-4 correspond to 0-order, +1-order, −1-order, and 2-order OAM propagation modes, respectively. Compositor 26-1 performs composition by adding signal components, which are output from weighting units 25-1-1 to 25-2-2, of the 0-order OAM propagation mode. Compositor 26-2 performs composition by adding signal components, which are output from weighting units 25-1-1 to 25-2-2, of the +1-order OAM propagation mode. Compositor 26-3 performs composition by adding signal components, which are output from weighting units 25-1-1 to 25-2-2, of the −1-order OAM propagation mode. Compositor 26-4 performs composition by adding signal components, which are output from weighting units 25-1-1 to 25-2-2, of the 2-order OAM propagation mode. Compositors 26-1 to 26-4 output composed reception signals R(0), R(+1), R(−1), and R(2) of the respective OAM propagation modes to demodulator 22.

Demodulator 22 includes a table, in which the OAM propagation modes are associated with information, similar to modulator 11 of transmission device 10. Demodulator 22 determines the OAM propagation modes (that is, signals using certain OAM propagation modes are received) of the reception signals based on the reception signals, which are output from compositors 26-1 to 26-4, of the respective OAM propagation modes. Furthermore, demodulator 22 demodulates information based on the table and the determined OAM propagation modes, and outputs demodulated information.

For example, demodulator 22 compares signal electricity of each of reception signals R(0), R(+1), R(−1), and R(2) of the respective OAM propagation modes with a predetermined threshold. Furthermore, demodulator 22 determines an OAM propagation mode corresponding to a signal, which has signal electricity greater than the predetermined threshold, as the OAM propagation mode of the reception signal.

Next, a table, which is used for the modulation process in modulator 11 and the demodulation process in demodulator 22, will be described with reference to FIG. 4.

FIG. 4 is a diagram illustrating an example of a table according to the exemplary embodiment. In the table illustrated in FIG. 4, the 0-order OAM propagation mode is assigned in association with 2-bit data "00". In the same manner, +1-order, −1-order, and 2-order OAM propagation modes are assigned in association with 2-bit data "01", "10", and "11", respectively.

Next, the modulation process of modulator 11 and the demodulate process of demodulator 22 will be described based on the table illustrated in FIG. 4.

Modulator 11 of transmission device 10 and demodulator 22 of reception device 20 include the same table.

Modulator 11 selects an OAM propagation mode to be used based on the 2-bit data to be input and the table illustrated in FIG. 4. For example, in a case where the 2-bit data to be input is "00", modulator 11 selects the 0-order OAM propagation mode, as illustrated in FIG. 4. Modulator 11 outputs an already-known signal from connection terminal T(0) corresponding to the 0-order OAM propagation mode. Furthermore, transmitter 12 transmits the already-known signal using the 0-order OAM propagation mode.

Demodulator 22 determines the OAM propagation mode of the reception signal, and demodulates the data with reference to the table illustrated in FIG. 4. For example, in a case where the OAM propagation mode of the reception signal is the 0-order OAM propagation mode, demodulator 22 outputs 2-bit data "00".

Next, selection of the OAM propagation mode with respect to bit strings (data series) to be input will be described with reference to FIG. 5.

Figure 5:
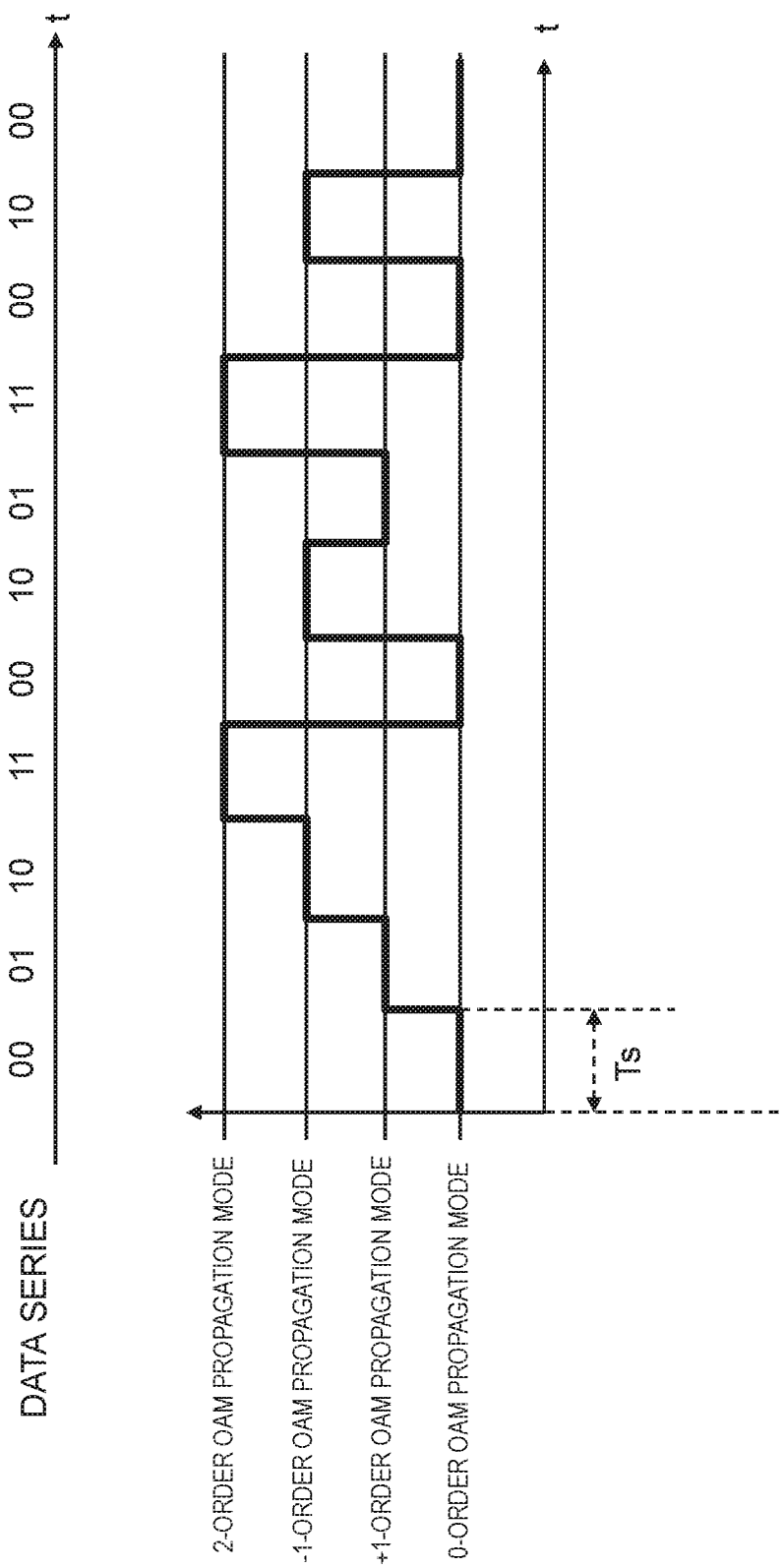
FIG. 5 is a diagram illustrating an example of a selection order of OAM propagation modes according to the first exemplary embodiment of the present disclosure.

FIG. 5 is a diagram illustrating an example of a selection order of OAM propagation modes according to the exemplary embodiment. FIG. 5 illustrates data series to be input and the OAM propagation modes, which are selected with respect to the data series, at every symbol interval Ts. Modulator 11 selects the OAM propagation mode at every 2 bits of the data series to be input, and outputs a signal of the selected OAM propagation mode at every Ts.

Although FIG. 4 illustrates the table in which one OAM propagation mode is associated with 2-bit data, the present disclosure is not limited thereto. Another example of the table will be described with reference to FIG. 6.

FIG. 6 is a diagram illustrating another example of the table according to the exemplary embodiment. In the table illustrated in FIG. 6, the 0-order and the +1-order OAM propagation modes are assigned in association with 2-bit data "00". In the same manner, the +1-order and the −1-order, the −1-order and the 2-order, and the 2-order and the 0-order OAM propagation modes are assigned in association with respective 2-bit data "01", "10", and "11".

In a case where the modulation process is performed with referent to the table illustrated in FIG. 6, modulator 11 selects two OAM propagation modes. For example, in a case where 2-bit data to be input is "00", modulator 11 selects the 0-order and the +1-order OAM propagation modes. Furthermore, modulator 11 outputs already-known signals from connection terminals T(0) and T(+1) which respectively correspond to the 0-order and the +1-order OAM propagation modes.

In this case, the already-known signals, which are output from two connection terminals by modulator 11, may be the same with each other or may be different from each other. In addition, in a case where modulator 11 selects two or more OAM propagation modes, weighting unit 13 adds and composes signals acquired after applying weighting in an adder which is not illustrated in the drawing, and outputs the composed signal to relevant mixer 14.

Demodulator 22 determines the two OAM propagation modes included in the reception signals, and demodulates the data. For example, in a case where the OAM propagation modes of the received signals are the 0-order and the +1-order OAM propagation modes, demodulator 22 outputs 2-bit data "00".

In the above-described exemplary embodiment, transmission device 10 has a configuration in which at least any one OAM propagation mode is selected among the plurality of OAM propagation modes based on information to be transmitted, and a signal having the selected at least one OAM propagation mode is transmitted. In addition, reception device 20 has a configuration in which information is demodulated in accordance with the OAM propagation mode of the reception signal. According to the configuration, in a system in which communication is performed using wireless signals having the plurality of OAM propagation modes, it is possible to perform modulation/demodulation using the OAM propagation modes with an easy configuration.

In addition, since signals of the OAM propagation modes are orthogonal to each other, there is a low possibility that an OAM propagation mode transmitted by a transmission side is erroneously determined by a reception side. Therefore, it is possible to reduce errors in a case where demodulation is performed.

In the exemplary embodiment, a case where the information which is input in modulator 11 is the bit data is described. However, the present disclosure is not limited thereto. A configuration, in which the OAM propagation mode is selected by modulator 11 in accordance with the information to be input, may be provided.

In addition, in the exemplary embodiment, a configuration in which signals of the four OAM propagation modes are transmitted is described. However, the present disclosure is not limited thereto. A configuration, in which signals of three or less OAM propagation modes or five or more OAM propagation modes are transmitted, may be provided. In a case where the number of OAM propagation modes which can be transmitted increases, it is possible to realize multi-value of the modulation. For example, in a case where the transmission device has a configuration in which eight OAM propagation modes are transmitted, it is possible to transmit 3 bit data at one symbol interval.

(Second Exemplary Embodiment)

The above-described first exemplary embodiment has provided a description of a configuration, in which modulation/demodulation is performed by selecting the OAM propagation mode based on the table in which the information to be input is associated with the OAM propagation modes. A second exemplary embodiment will provide a description of a configuration in which secondary modulation/demodulation for diffusing data signals corresponding to one symbol using a diffusion pattern which indicates orders of the plurality of OAM propagation modes.

An OAM transmission system according to the second exemplary embodiment is the same as the OAM transmission system illustrated in FIG. 1. In the OAM transmission system according to the second exemplary embodiment, mostly, a process of modulator 11 of transmission device 10 and a process of demodulator 22 of reception device 10 are different from those of the first exemplary embodiment. Hereinafter, the process of modulator 11 and the process of demodulator 22 according to the second exemplary embodiment will be described with reference to FIG. 7.

Figure 7:
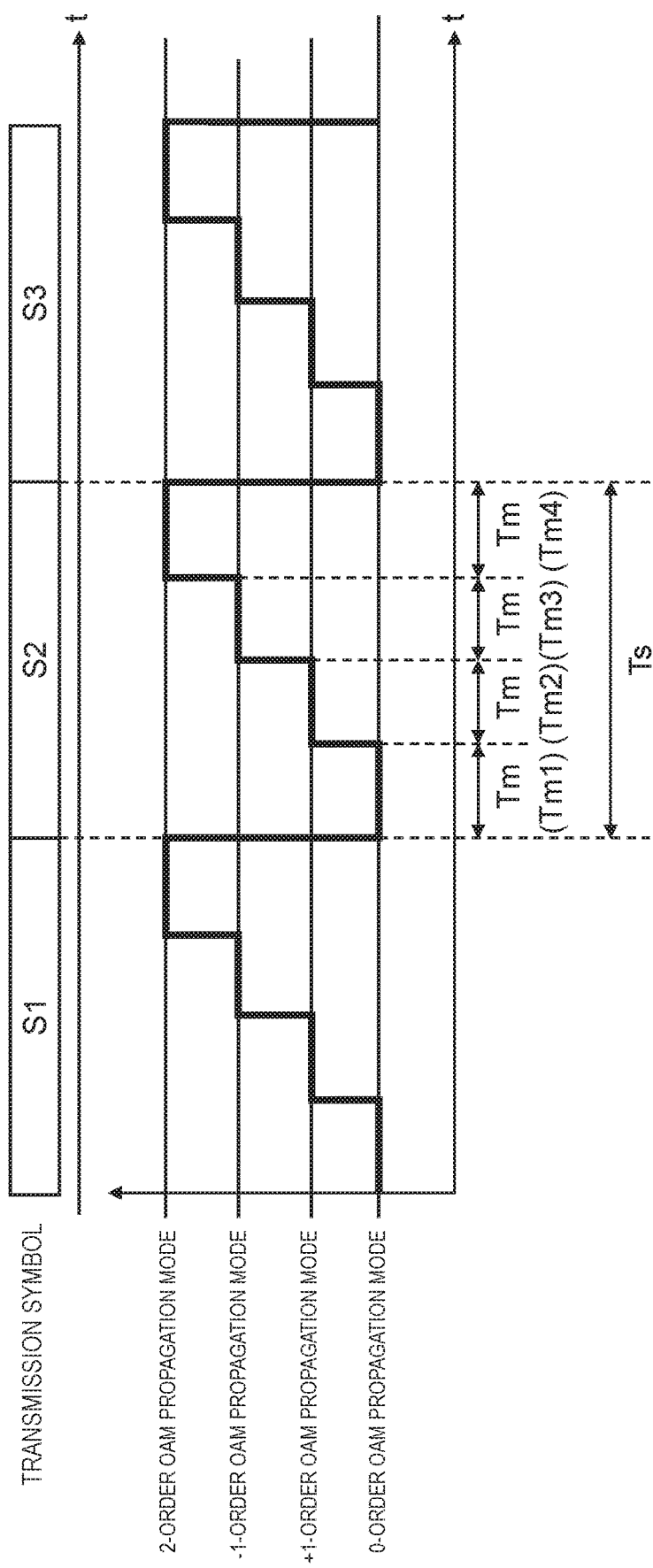
FIG. 7 is a diagram illustrating an example of a selection order of the OAM propagation modes according to a second exemplary embodiment of the present disclosure.

FIG. 7 is a diagram illustrating an example of a selection order of the OAM propagation modes according to the exemplary embodiment. FIG. 7 illustrates transmission symbols S1 to S3 and the selection order, in which the transmission symbols are transmitted, of the OAM propagation modes. The diffusion pattern of FIG. 7 is a diffusion pattern which illustrates the selection order of the four OAM propagation modes including 0-order, +1-order, −1-order, and 2-order.

Modulator 11 divides the transmission symbols, which are input from a baseband modulator (not illustrated in the drawing), for every mode interval Tm (=(1/4)Ts) on a time axis. Modulator 11 outputs the respective transmission symbols, which are acquired by performing division, from the respective connection terminals based on the selection order which is indicated by the diffusion pattern.

Furthermore, modulator 11 outputs already-known dummy signals from output terminals corresponding to the OAM propagation modes, which are not selected, in accordance with the selection order displayed by the diffusion pattern. The already-known dummy signals are signals different from the transmission symbols which are acquired through division, and have the equivalent electricity as the electricity of the transmission symbols which are acquired through division.

Transmitter 12 transmits the transmission symbols, which are acquired through division and are output from modulator 11, or the dummy signals using the respective relevant OAM propagation modes.

Receiver 21 of reception device 20 converts (divides) the received signals into the reception signals of the respective OAM propagation modes, and outputs the reception signals to demodulator 22.

Demodulator 22 has a diffusion pattern which is the same as the diffusion pattern included in modulator 11. Demodulator 22 combines reception symbols among signals, which are output from demodulator 22, of the respective OAM propagation modes in accordance with an order indicated by the diffusion pattern, and outputs the combined reception symbol to an external baseband demodulator (not illustrated in the drawing).

As an example, a process, which is performed between transmission and reception in a case where transmission device 10 transmits transmission symbol S2, will be described.

Modulator 11 performs division on transmission symbol S2 at every Tm on the time axis. Hereinafter, transmission symbols, which are acquired through division, are sequentially referred to as S21, S22, S23, and S24.

Modulator 11 outputs transmission symbol S21, which is acquired through division, to connection terminal T(0) corresponding to the 0-order OAM propagation mode at interval Tm1, and transmits the dummy signals to connection terminals T(+1), T(−1), and T(2) corresponding to the +1-order, −1-order, and 2-order OAM propagation modes, respectively. Transmitter 12 transmits transmission symbol S21, which is acquired through division, using the 0-order OAM propagation mode at interval Tm1 based on the output from modulator 11, and transmits the dummy signals using the +1-order, −1-order, and 2-order OAM propagation modes.

In the same manner, transmitter 12 transmits transmission symbol S22, which is acquired through division, using the +1-order OAM propagation mode at interval Tm2, and transmits the dummy signals using the 0-order, −1-order, and 2-order OAM propagation modes. Transmitter 12 transmits transmission symbol S23, which is acquired through division, using the −1-order OAM propagation mode at interval Tm3, and transmits the dummy signals using the 0-order, −1-order, and 2-order OAM propagation modes. Transmitter 12 transmits transmission symbol S24, which is acquired through division using the 2-order OAM propagation mode at interval Tm4, and transmits the dummy signals using the 0-order, +1-order, and −1-order OAM propagation modes.

Receiver 21 performs a reception process with respect to the signal which is transmitted at every Tm interval, and divides the received signal into the reception signals of the respective OAM propagation modes. Receiver 21 outputs the reception signals, which are acquired through division, of the respective OAM propagation modes to demodulator 22.

Demodulator 22 extracts reception signal R(0) of the 0-order OAM propagation mode at an interval corresponding to interval Tm1. Here, demodulator 22 destructs the reception signals of the +1-order, −1-order, and 2-order OAM propagation modes. In the same manner, demodulator 22 extracts reception signals R(+1), R(−1), and R(2) of the +1-order, −1-order, and 2-order OAM propagation modes at intervals corresponding to intervals Tm2, Tm3, and Tm4, respectively. After demodulator 22 extracts the reception signals of the OAM propagation modes corresponding to a single period of the diffusion pattern, that is, one symbol, demodulator 22 combines the extracted signals and demodulates and outputs the reception symbols.

According to the above-described exemplary embodiment, a reception device, which is different from a communication partner of the transmission device, does not know the diffusion pattern. Therefore, it is not possible to intercept a signal transmitted by the transmission device. In addition, the transmission device transmits the dummy signals using the OAM propagation modes which are not selected based on the diffusion pattern. Therefore, it is not possible for the reception device, which is different from the communication partner of the transmission device, to estimate a transmission signal base on signal intensity between respective OAM propagation modes. Therefore, it is possible to improve confidentiality of communication between the transmission device and the reception device, which share the diffusion pattern with each other, without diffusing a band.

The transmission device according to the exemplary embodiment is described as a configuration in which signals of the four OAM propagation modes are transmitted. However, the present disclosure is not limited thereto. A configuration, in which signals of the OAM propagation modes whose number is equal to or smaller than 3 or is equal to or greater than 5 are transmitted, may be provided. In a case where the number of OAM propagation modes which can be transmitted increases, it is possible to cause the pattern used to select the OAM propagation modes to be complicated, and thus it is possible to further improve the confidentiality.

In addition, in the exemplary embodiment, the diffusion pattern, in which one symbol interval Ts=4 Tm and one OAM propagation mode is selected four times at every mode interval Tm within one symbol interval, is described. However, the present disclosure is not limited thereto. A diffusion pattern, in which two or more OAM propagation modes are selected at every mode interval Tm, may be provided. In addition, a length of the diffusion pattern, that is, the number of selections of the OAM propagation modes within one symbol interval may be equal to or smaller than 3 or may be equal to or greater than 5. A diffusion pattern, in which one OAM propagation mode is selected a plurality of times within one symbol interval, may be provided.

In each of the above-described exemplary embodiments, a configuration in which the transmission device includes the 2×2 array antenna disposed in square is described. However, the present disclosure is not limited thereto. A configuration in which the transmission device transmits signals of a plurality of OAM propagation modes may be provided. For example, a configuration, in which the transmission device transmits the signals of the plurality of OAM propagation modes using a circular array antenna in which the antenna elements are disposed in a circle, may be provided. Otherwise, a configuration, in which the transmission device includes transmission antennas corresponding to the plurality of OAM propagation modes, respectively, and outputs signals from the transmission antennas corresponding to the OAM propagation modes selected by the modulator, may be provided. The configurations are the same as in the reception device.

In addition, in the exemplary embodiment, a case in which the present disclosure includes hardware is described as an example. However, it is possible to realize the present disclosure using software in cooperation with the hardware.

In addition, the respective functional blocks which are used for the description of the respective exemplary embodiments are typically realized as an LSI which is an integrated circuit. The functional blocks may be individually realized by one chip or may be realized by one chip so as to include a part or an entity thereof. Here, although the LSI is described, there is a case of being referred to as an IC, a system LSI, a super LSI, or an ultra LSI due to difference in a degree of integration.

In addition, an integrated circuit method is not limited to the LSI, and may be realized using a dedicated circuit or a general-purpose processor. Field Programmable Gate Array (FPGA), in which it is possible to perform programming after manufacturing the LSI, or a reconfigurable processor, in which it is possible to reconfigure connection or setting of circuit cells in the LSI, may be used.

Furthermore, in a case where a technology for integrated circuits, which are replaced by the LSI due to progress of a semiconductor technology or another deriving technology, appears, it is apparent that the functional blocks may be integrated using the technology. Application of a biotechnology or the like may be performed as possibility.

INDUSTRIAL APPLICABILITY

The present disclosure is useful for a wireless communication apparatus, which performs communication using a plurality of OAM propagation modes, and a wireless communication method.

REFERENCE MARKS IN THE DRAWINGS 1-1, 1-2, 2-1, 2-2 ANTENNA ELEMENT
10 TRANSMISSION DEVICE
11 MODULATOR
12 TRANSMITTER
13, 25 WEIGHTING UNIT
14, 24 MIXER
15, 23 AMPLIFIER
20 RECEPTION DEVICE
21 RECEIVER
22 DEMODULATOR
26 COMPOSITOR
100 ARRAY ANTENNA

The invention claimed is:

1. A transmission device comprising:
a modulator that selects an Orbital Angular Momentum (OAM) propagation mode among N OAM propagation modes in accordance with a value of bit data to be transmitted, N being an integer equal to or greater than 2; and
a transmitter that transmits a signal of the OAM propagation mode selected by the modulator,
wherein the modulator selects K OAM propagation modes based on a table in which the value of the bit data is associated with any of K of the N OAM propagation modes, K being an integer equal to or greater than 1 and being smaller than N, and
wherein the transmitter transmits signals of the K OAM propagation modes.

2. A reception device comprising:
a receiver that receives a signal of an Orbital Angular Momentum (OAM) propagation mode selected among N OAM propagation modes, N being an integer equal to or greater than 2; and
a demodulator that outputs a value of bit data in accordance with the OAM propagation mode of the received signal,
wherein the demodulator outputs the value of bit data based on a table in which the value of the bit data is associated with any of K of the N OAM propagation modes, K being an integer equal to or greater than 1 and being smaller than N, and
wherein the receiver receives signals of the K OAM propagation modes.

3. A transmission device comprising:
a modulator that selects an Orbital Angular Momentum (OAM) propagation mode based on a pattern which indicates a selection order in which each of N OAM propagation modes is sequentially selected K times, N being an integer equal to or greater than 2, K being an integer equal to or greater than 1; and
a transmitter that transmits a signal of the OAM propagation mode in accordance with an order selected by the modulator at one symbol interval which includes K mode intervals.

4. The transmission device of claim 3,
wherein the transmitter transmits, using the OAM propagation mode in accordance with the order selected by the modulator, each of K signals, which are acquired by dividing a data signal corresponding to one symbol into K, at one symbol interval.

5. The transmission device of claim 3,
wherein the transmitter transmits a dummy signal using an OAM propagation mode which is not selected by the modulator.

6. A reception device comprising:
a receiver that receives a signal of an Orbital Angular Momentum (OAM) propagation mode corresponding to K mode intervals, K being an integer equal to or greater than 1; and
a demodulator that demodulates a symbol from the received signal based on a pattern which indicates a selection order in which at least one of N OAM propagation modes is sequentially selected K times, N being an integer equal to or greater than 2.

7. A communication method comprising:
selecting an Orbital Angular Momentum (OAM) propagation mode among N OAM propagation modes in accordance with a value of bit data to be transmitted, N being an integer equal to or greater than 2;
transmitting a signal of the selected OAM propagation mode;
receiving the signal of the selected OAM propagation mode among N OAM propagation modes; and
outputting the value of the bit data in accordance with the OAM propagation mode of the received signal,
wherein the selecting includes selecting K OAM propagation modes based on a table in which the value of the bit data is associated with any of K of the N OAM propagation modes, K being an integer equal to or greater than 1 and being smaller than N, and
wherein the transmitting includes transmitting signals of the K OAM propagation modes.

8. A communication method comprising:
selecting an Orbital Angular Momentum (OAM) propagation mode based on a pattern which indicates a selection order in which each of N OAM propagation modes is sequentially selected K times, N being an integer equal to or greater than 2, K being an integer equal to or greater than 1;
transmitting a signal of the OAM propagation mode in accordance with an order selected at one symbol interval which includes K mode intervals;
receiving the signal of the OAM propagation mode corresponding to K mode intervals; and
demodulating a symbol from the received signal based on the pattern.

* * * * *